(12) United States Patent
Choi et al.

(10) Patent No.: US 8,782,720 B2
(45) Date of Patent: Jul. 15, 2014

(54) METHOD AND SYSTEM FOR SYNCHRONIZING CONTENT BETWEEN TERMINALS

(75) Inventors: Hun-Hoi Choi, Gangneung-si (KR); Hwa-Suk Kim, Daejeon-si (KR); Kee-Seong Cho, Daejeon-si (KR); Geun-Hyung Kim, Busan-si (KR); Jae-Chan Shim, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 16 days.

(21) Appl. No.: 13/533,151

(22) Filed: Jun. 26, 2012

(65) Prior Publication Data

US 2013/0007819 A1    Jan. 3, 2013

(30) Foreign Application Priority Data

Jun. 30, 2011    (KR) .................. 10-2011-0064959

(51) Int. Cl.
*H04L 7/10* (2006.01)
*H04N 21/43* (2011.01)
*H04L 29/08* (2006.01)
*H04L 7/00* (2006.01)
*H04N 7/173* (2011.01)

(52) U.S. Cl.
CPC ........ *H04N 21/4302* (2013.01); *H04L 29/0854* (2013.01); *H04L 7/0012* (2013.01); *H04N 7/17336* (2013.01)
USPC .................................. 725/87; 725/88; 725/94

(58) Field of Classification Search
CPC ........... H04N 21/4302; H04N 7/17318; H04L 7/0012; H04L 29/0854
USPC ................................................ 725/88, 87, 94
See application file for complete search history.

(56) References Cited

U.S. PATENT DOCUMENTS 4,453,259 A * 6/1984 Miller ........................... 375/355
5,467,137 A * 11/1995 Zdepski .................... 375/240.29
(Continued)

FOREIGN PATENT DOCUMENTS

KR    10-2011-0001696 A    1/2011
KR    10-2011-0014897 A    2/2011
(Continued)

OTHER PUBLICATIONS

An application-level QoS comparison of inter-destination synchronization schemes for continuous media multicasting, Nunome et al., IEEE Global Telecommunications Conference, vol. 7, 2003. pp. 3602-3608.*

(Continued)

*Primary Examiner* — Nasser Goodarzi
*Assistant Examiner* — Michael B Pierorazio
(74) *Attorney, Agent, or Firm* — William Park & Associates Patent Ltd.

(57) ABSTRACT

A synchronization apparatus and method for synchronizing playback time of a media provided to multiple devices during service transfer and replication process are provided. The content synchronization system for providing a receiving terminal with content of a sending terminal, the content synchronization system includes the sending terminal; the receiving terminal; and a server configured to provide content to the sending terminal and the receiving terminal and to comprise a communication unit configured to communicate the sending terminal and the receiving terminal and to transmit a message and information about time point at which the message is sent, and a content playback time point calculating unit configured to calculate a first content playback start time point of the receiving terminal in an effort to provide the content of the sending terminal that is synchronized with the receiving terminal.

16 Claims, 10 Drawing Sheets

(56) References Cited

U.S. PATENT DOCUMENTS

| | | | |
|---|---|---|---|
| 5,486,864 A * | 1/1996 | Zdepski | 348/423.1 |
| 5,808,662 A * | 9/1998 | Kinney et al. | 348/14.1 |
| 6,169,843 B1 * | 1/2001 | Lenihan et al. | 386/201 |
| 6,233,695 B1 * | 5/2001 | Ahn | 713/400 |
| 6,269,122 B1 * | 7/2001 | Prasad et al. | 375/240.28 |
| 6,300,863 B1 * | 10/2001 | Cotichini et al. | 340/5.8 |
| 6,598,172 B1 * | 7/2003 | VanDeusen et al. | 713/503 |
| 6,611,537 B1 * | 8/2003 | Edens et al. | 370/503 |
| 6,622,171 B2 * | 9/2003 | Gupta et al. | 709/231 |
| 6,741,290 B1 * | 5/2004 | Wells | 348/512 |
| 7,269,338 B2 * | 9/2007 | Janevski | 386/201 |
| 7,344,084 B2 * | 3/2008 | DaCosta | 235/472.01 |
| 7,349,359 B2 * | 3/2008 | Chang et al. | 370/312 |
| 7,406,703 B2 * | 7/2008 | Lee et al. | 725/32 |
| 7,457,542 B2 * | 11/2008 | Sekine et al. | 398/72 |
| 7,707,303 B2 * | 4/2010 | Albers et al. | 709/231 |
| 7,712,125 B2 * | 5/2010 | Herigstad et al. | 725/141 |
| 7,796,551 B1 * | 9/2010 | Machiraju et al. | 370/330 |
| 7,987,491 B2 * | 7/2011 | Reisman | 725/112 |
| 8,089,911 B2 * | 1/2012 | Huang et al. | 370/312 |
| 2002/0056129 A1 * | 5/2002 | Blackketter et al. | 725/112 |
| 2002/0118199 A1 * | 8/2002 | Mukherjee et al. | 345/504 |
| 2003/0091322 A1 * | 5/2003 | Van Der Schaar | 386/46 |
| 2003/0135632 A1 * | 7/2003 | Vrzic et al. | 709/231 |
| 2004/0025184 A1 * | 2/2004 | Hakenberg et al. | 725/90 |
| 2004/0031058 A1 * | 2/2004 | Reisman | 725/112 |
| 2004/0226050 A1 * | 11/2004 | Matsuzaki et al. | 725/135 |
| 2005/0058090 A1 * | 3/2005 | Chang et al. | 370/312 |
| 2005/0166135 A1 * | 7/2005 | Burke et al. | 715/500.1 |
| 2005/0216731 A1 * | 9/2005 | Saito et al. | 713/153 |
| 2006/0031914 A1 * | 2/2006 | Dakss et al. | 725/135 |
| 2006/0112168 A1 * | 5/2006 | Albers et al. | 709/213 |
| 2006/0227796 A1 * | 10/2006 | Wei et al. | 370/412 |
| 2006/0280502 A1 * | 12/2006 | Sekine et al. | 398/71 |
| 2008/0134258 A1 * | 6/2008 | Goose et al. | 725/91 |
| 2008/0198785 A1 * | 8/2008 | Huang et al. | 370/312 |
| 2009/0247211 A1 * | 10/2009 | Kuroda | 455/522 |
| 2010/0100917 A1 * | 4/2010 | Chiao et al. | 725/110 |
| 2010/0138561 A1 * | 6/2010 | Church | 709/248 |
| 2010/0232453 A1 * | 9/2010 | Ohashi | 370/468 |
| 2010/0303100 A1 * | 12/2010 | Niamut et al. | 370/503 |
| 2012/0002111 A1 * | 1/2012 | Sandoval et al. | 348/521 |
| 2012/0079541 A1 * | 3/2012 | Pan | 725/62 |
| 2013/0251329 A1 * | 9/2013 | McCoy et al. | 386/201 |
| 2014/0029910 A1 * | 1/2014 | Maruyama et al. | 386/220 |

FOREIGN PATENT DOCUMENTS

| | | |
|---|---|---|
| KR | 10-1033713 B1 | 4/2011 |
| WO | 2008048428 A1 | 4/2008 |

OTHER PUBLICATIONS

Flow synchronization protocol, Escobar et al., IEEE/ACM Transactions on Networking, vol. 2, issue 2, 1994, p. 111-121.*

* cited by examiner

METHOD AND SYSTEM FOR SYNCHRONIZING CONTENT BETWEEN TERMINALS

CROSS-REFERENCE TO RELATED APPLICATION(S)

This application claims the benefit under 35 U.S.C. §119 (a) of Korean Patent Application No. 10-2011-0064959, filed on Jun. 30, 2011, in the Korean Intellectual Property Office, the entire disclosure of which is incorporated herein by reference for all purposes.

BACKGROUND

1. Field

The following description relates to a system and method for transferring and replicating a service among devices in a media content service environment, and more particularly, to an apparatus and method for synchronizing playback time of a media being provided to multiple devices during service transfer and replication process.

2. Description of the Related Art

As Internet use has grown, more attention has been given to media transfer over the Internet and to multimedia services using web technologies. To satisfy such interest in media services, studies on hypertext transfer protocol (HTTP) streaming and its standardization have been actively conducted for recent years. Some standardization organizations have established and distributed standard documents regarding technologies on HTTP-based streaming services. There are a number of HTTP-based media transfer platforms in use.

Media streaming has increased its role in content delivery over the Internet, and becomes essential to various applications, such as distance learning, digital libraries, home shopping services, video-on-demand services, and the like. For media content streaming services, various protocols, such as HTTP, Real Time Streaming Protocol (RTSP)/Real-time Transfer Protocol (RTP), Real Time Message Protocol (RTMP), Multi-media Message Service (MMS), and the like, are used. HTTP streaming is one of the most popular methods for media content services over the Internet. In HTTP streaming, media data/file is divided into a number of small pieces and the small pieces of data are sequentially transmitted through port 80/8080 to a receiver. The HTTP streaming may support a variety of streaming media formats such as MP4, MPEG2-TS, H.264/AAC and the like, and codecs, and use HTTP to provide streaming services by means of Windows Media/Silver Light Streaming, Flash Video, QuickTime Streaming server, Real Media Streaming, etc. The HTTP streaming has recently drawn increasing attention due to its superior streaming capabilities. A conventional media protocol uses a UDP port number that is rarely used, and thus in some cases a service is not available in some firewalls and routers.

In contrast, HTTP-based media transfer uses port 80/8080 only, and thus no traffic is blocked by existing firewalls or routers. In addition, a media service means using HTTP can advantageously use an inexpensive standard HTTP server and HTTP cache without the need of use of a specialized proxy and caches. Recently, HTTP is used in most cases to send a request from a content delivery network (CDN), to retrieve a multimedia object that is stored in a cache, and to communicate with a policy server.

Currently, technology standardization for streaming services using HTTP is in progress by a number of standard development organizations. 3GPP established the standard specification TS 26.234 for adaptive HTTP streaming as an alternative to media transfer using an existing RTSP/RTP, which deals with Media Presentation Description (MPD), media segmentation format, an HTTP server, client behaviors, and the like.

Open IPTV Forum (OIPF) has established technology specification for adaptive HTTP streaming, which is refined based on the 3GPP HTTP streaming specification so that it can be applied to OIPF services and devices. Recently, ISO/IEC JTC1/SC29/WG11 (MPEG) groups are under process of developing a new standard for HTTP streaming. This standard specifies requirements for transmitting MPEG media using HTTP, and its applications, and contents of documents (MPEG-1, MPEG-2, MPEG-3, MPEG-4) including purpose of establishment.

Media transfer platforms based on HTTP have been developed and used by a number of different companies in an effort to provide users with adaptive services with good service quality. Microsoft has implemented Smooth Streaming that is based on web over which media content is delivered using standard HTTP. Smooth Streaming does not deliver a media by downloading all data, but instead, divides the content a series of small "chunks" and sequentially delivering the chucks to a user and has advantages that files are easily cached to an edge server which is closer to a user. Adobe HTTP dynamic streaming suggested by Adobe systems Inc. enables real-time video streaming of media having various transmission rate and on-demand services.

Adobe HTTP dynamic streaming fragments a media file into smaller pieces, so that a Flash player user is allowed to use the media file without a need of downloading the entire file. Apple HTTP live streaming by Apple Inc. enables audio or video that is made previously or in real time to be played back on iOS-based devices, such as an iPhone, or on desktop computers running Mac OS X, and supports various transmission rates of existing web servers for media delivery.

1. Technique for Service Transfer between Terminals by OIPF (Open IPTV Forum)

The OIPF standardization group published service and platform requirements for release 2 related to service moving between terminals in December 2008, and thereafter announced related standard in September 2010. OIPF defines abilities, namely, session continuity and session portability in relation to service moving between terminals. Session continuity is the ability to move, in real time, a given service or application from one IPTV terminal functionality (ITF) to another resulting in the continuation of an existing session, and service portability is the ability that a given service or application can be utilized on various types of ITF for real-time continuation of a session.

In regard to session continuity, 1) session continuity should be supported under the control of a user, 2) when there is a request to move a session to another ITF, continuous service experience to the user should be supported, and 3) a mechanism for an IPTV service provider should be supported to duplicate an existing service session on another ITF.

To ensure session continuity, session transfer and session replication are defined. Session transfer allows a user to transfer an ongoing unicast session from a terminal (an original device) where the content is currently being streamed to another terminal (a target device) where the user can resume watching the same content. After the successful transfer of the session, the original session is terminated. Session replication allows a user to replicate an ongoing session from one terminal (an original device) to another terminal (a target device). The original session continues to be maintained after the successful replication of the session. After the session replication, the original device and the target device have completely independent sessions.

There are two modes of operation for session transfer and session replication depending on which terminal that requests the session transfer and the session replication. The two modes are push mode and pull mode. In push mode, an end-user requests to push the current session from a terminal that the user is currently using to a target terminal. In pull mode, an end-user uses a target terminal to pull a session that the user desires to transfer or replicate or uses the target terminal to request the replication of the session. OIPF standard has taken into consideration session transfer between terminals existing on the same access, for example, session transfer between terminals having the same IPTV subscription.

2. IMS (IP Multimedia Subsystem)-Based Technique for Inter-UE Service Transfer of 3GPP This technique relates mobility of media flows and control of a session between different user equipment (UE) under the same subscription, and focuses on inter-UE transfer scenarios for transferring/retrieval/addition/deletion of media flows in a collaborative session, establishment or continuation of a collaborative session while transferring control, and the like.

For inter-UE service session transfer, IMS standard defines two types of UE: a controller UE and a controllee UE. A controller UE has the control of media flows, and a controllee UE is subordinate to the controller UE for media flow control. In addition, a collaborative session is defined for the support of service session transfer.

All UEs in a collaborative session support functionalities of (1) discovering an inter-UE transfer target for inter-UE transfer, (2) initiating inter-UE transfer procedures based on user inputs, and (3) acting as a controller UE in the collaborative session.

The general rules for providing IMS service session continuity are as follows. Inter-UE transfer for service continuity allows a multimedia session to be split to two or more UEs that are part of a collaborative session. The UEs are under the control of the same IMS subscription and may be connected to IMS core network (CN) from a diverse set of access network. A service centralization and continuity application server (SCC AS) is used to connect the UEs to their remote peer devices. The SCC AS performs control and management of a collaborative session. The controllee UE controls its media flow using media control signaling. The media control enables the controllee UE to operate.

Service consistency and service continuity functions are established so as to enable set up and session transfers of multimedia session across multiple UEs. One UE provides collaborative session control and the media flow is established using the UE providing the collaborative session control and/or other UEs.

To provide IMS service continuity, functionalities of establishment and release of the collaborative session, transferring, addition, modification and deletion of media flows and transferring of collaborative session controls are required. In a current media content service environment, due to a communication delay time between different devices during service transfer and replication process, media playback time changes after the service is delivered to a target terminal.

SUMMARY

In one general aspect, there is provided a content synchronization method for providing a receiving terminal with content of a sending terminal in a system that includes the sending terminal, the receiving terminal and a server to provide content to the sending terminal and the receiving terminal, comprising: receiving, at the server, a session request message from the receiving terminal to request the sending terminal to provide currently played back content to the receiving terminal; receiving, at the server, session information from the sending terminal; and calculating a first content playback start time point by adding a transmission delay time to a content playback time point of the sending terminal that is included in the session information, the transmission delay time including a session information deliver delay time taken by the session information to be transmitted from the sending terminal to the receiving terminal and a content request message delivery time taken by the content request message to be transmitted from the receiving terminal to the server to request the content.

In another general aspect, there is provided a content synchronization method for providing a receiving terminal with content of a sending terminal in a system that includes the sending terminal, the receiving terminal and a server to provide the content to the sending terminal and the receiving terminal, comprising: receiving, at the server, a session request message including session information of the sending terminal from the sending terminal to request the sever to provide content currently being played back by the sending terminal; and calculating a first content playback start time point by adding a transmission delay time to a content playback start time point of the sending terminal that is included in the session information, the transmission delay time including a session information delivery delay time taken by the session information to be transmitted to the receiving terminal and a content request message delivery time taken by a content request message to be transmitted from the receiving terminal to the server to request the content.

In another general aspect, there is provided a content synchronization method for providing a receiving terminal with content of a sending terminal in a system that includes the sending terminal, the receiving terminal and a server to provide the content to the sending terminal and the receiving terminal, comprising: receiving, at the sending terminal, a session request message from the receiving terminal to request the sending terminal to provide content currently played back to the receiving terminal; transmitting, at the sending terminal, session information to the receiving terminal; and calculating, at the server, a first content playback start time point by adding a transmission delay time to a content playback time point of the sending terminal that is included in the session information, the transmission delay time including a session information delivery delay time taken by the session information to be transmitted from the sending terminal to the receiving terminal and a content request message delivery time taken by a content request message to be transmitted from the receiving terminal to the server to request the content.

In another general aspect, there is provided a content synchronization method for providing a receiving terminal with content of a sending terminal in a system that includes the sending terminal, the receiving terminal and a server to provide the content to the sending terminal and the receiving terminal, the content synchronization method comprising: receiving, at the receiving terminal, a session request message including session information from the sending terminal to request the sending terminal to provide currently played back content to the receiving terminal; transmitting, at the receiving terminal, a content request message to the server to request the content; and calculating, at the server, a first content playback start time point of the receiving terminal by adding a transmission delay time to a content playback time point of the sending terminal, the transmission delay time including a session information delivery delay time taken by the session information to be transmitted from the sending terminal to the receiving terminal and a content request message delivery time taken by a content request message to be transmitted from the receiving terminal to the server to request the content.

In another general aspect, there is provided a content synchronization system comprising: a sending terminal; a receiving terminal; and a server configured to provide the receiving terminal with the content of the sending terminal, wherein the server further comprises a communication unit configured to communicate the sending terminal and the receiving terminal and to transmit a message containing a sending time point of the message, and a content playback time point calculating unit configured to calculate a first content playback start time point of the receiving terminal in an effort to provide the content of the sending terminal that is synchronized with the receiving terminal, and wherein the content playback time point calculating unit calculates a first content playback start time point of the receiving terminal by adding a transmission delay time to a content playback time point of the sending terminal, the transmission delay time including a session information delivery delay time taken by the session information to be transmitted from the sending terminal to the receiving terminal and a content request message delivery time taken by a content request message to be transmitted from the receiving terminal to the server to request the content.

Other features and aspects may be apparent from the following detailed description, the drawings, and the claims.

Figure 1:
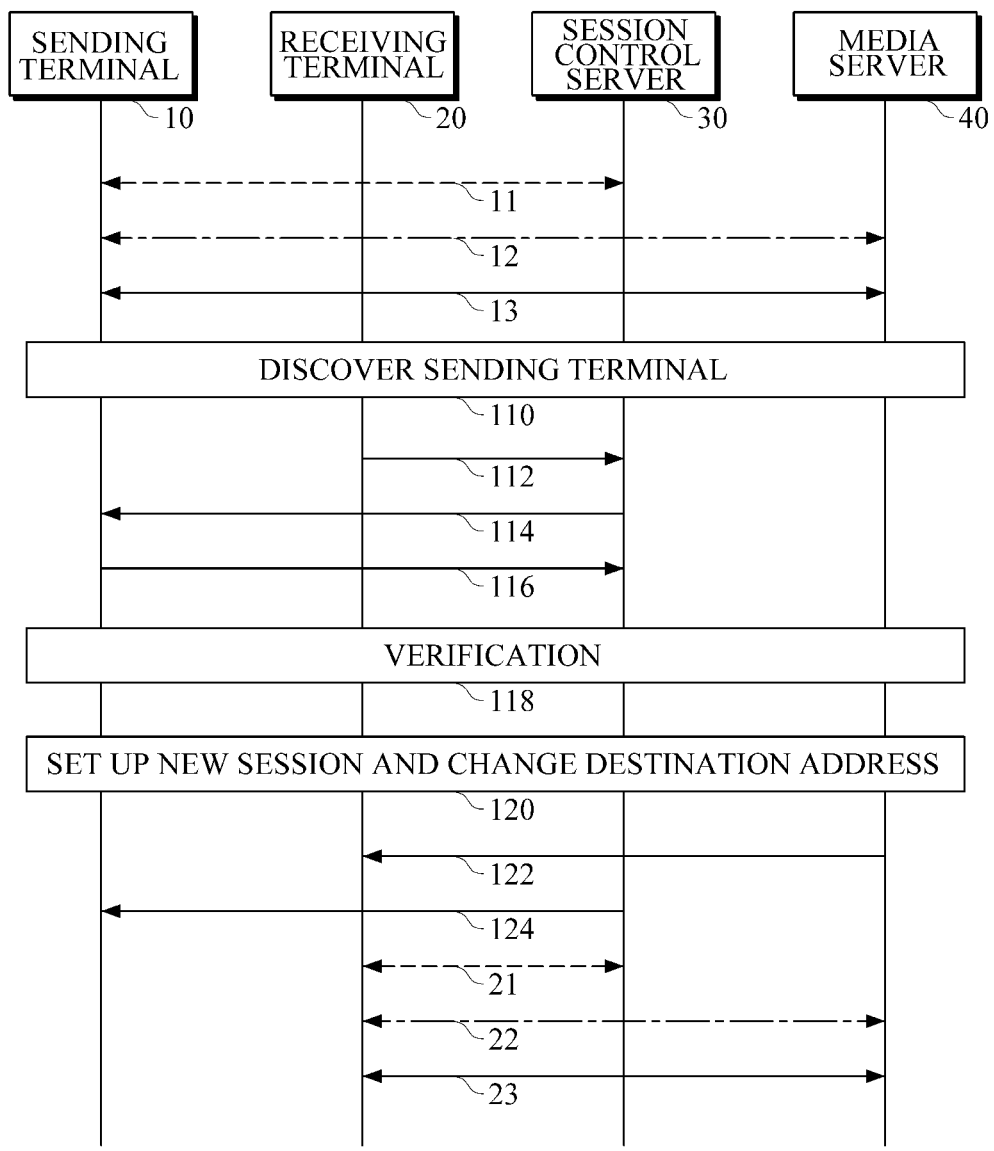
FIG. 1 is a flowchart illustrating an example of procedures of media service delivery using a pull method.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

For a media service between terminal devices and a remote server, "sessions" are provided. "Session transfer" includes media flow, media flow control and service session control (hereinafter, "service control"). The session transfer means for the media flow, the media flow control or the service control to be transferred to another terminal device.

The media flow refers to a flow of a variety of multimedia data, such as video data, audio data, and text data. The media flow control is to control a flow of media data, for example, interruption, playback, and stopping of a media flow, adjustment of a playback speed, and the like. The service control refers to a control on services that offers media data, for example, IPTV services, Voice over Internet protocol (VoIP) services, web services, and the like.

The session transfer may be classified into three modes including push mode, pull mode, and third party mode, according to the subject of a request for session transfer. In push mode, a device to transmit a session initiates a request for session transfer, and in pull mode, a device to receive the session initiates a request for session transfer. In third party mode, a device other than the devices that transmit or receive the session initiates a request for session transfer.

Recently, session initiation protocol (SIP) is generally used for a session transfer request. According to open IPTV forum (OIPF), HTTP is used between a premises device and IG, and SIP is used between IG and a network. As an alternative to the use of both HTTP and SIP, 3GPP PSS and OPIF have suggested the standards for session transfer and replication request by only using HTTP.

Session management subjects are classified into a controller to manage all sessions of collaborative session and controllees, which are devices subordinate to the controller. A controller and a session control server of a network manage all sessions within the collaborative session. Controllee devices manage only the sessions that are used by the controllee devices itself. The session control server performs session control and media flow control in the network, and examples of the session control server includes a service centralization and continuity application server (SCC AS) of 3GPP standards and an authentication and session management (ASM) of OIPF. In 3GPP, devices to which session transfer is available have to be under the same subscription. In OIPF, each of devices manages the ongoing sessions, and an IMS gateway (IG) and the authentication and session management (ASM) manage ongoing sessions at premises.

A group of devices and sessions that transmit and receive to and from each other may be classified into various categories. According to 3GPP, devices under the same subscriptions are allowed to transmit sessions, and according to OIPF, a particular means is used to transmit a session within one premise. For such session transfer, it is assumed that all in-premise devices which are capable of session transfer and replication are connected to an IG in premise. A third party device refers to a device within a range that session transfer and replication can be performed. For example, in 3GPP, the third party device refers to a device under the same subscription, and in OIPF, the third party device refers to a device in the same premise.

Hereinafter, scenarios for providing web-based media service mobility are provided. According to one exemplary embodiment, the scenarios for providing web-based media service mobility are applicable to both 3GPP and OIPF. The session transfer between devices may include service session control, media flow control, and media flow. In addition, for convenience of explanation, hereinafter, a device that is playing back content and transmits session information to a server or other terminals may be referred to as a "sending terminal", and a device that receives the session information and is synchronized with other devices to be provided with content may be referred to as a "receiving terminal". Furthermore, the sending terminal may be referred to as a "source terminal", and the receiving terminal may be referred to as a "target terminal".

FIG. 1 is a flowchart illustrating an example of procedures of media service delivery using a pull method.

A session control server 30 is a server to manage and control a service session for the provision and transmission of a media service, and a media server 40 provides a media to be serviced, and controls the media flow. The session control server 30 and the media server 40 are defined by functionality, and they may be implemented into one physical server.

In FIG. 1, the sending terminal 10 is a controller device having the authority to transfer a service control session 11 and a media flow control session 12, and to receive a media flow 13. Before transmitting a request for session transfer, the receiving terminal 20 searches for a sending terminal, such as the sending terminal 10, which is able to transfer the media flow to the receiving terminal 20 in operation 110.

The receiving terminal 20 issues a session transfer request to the session control server 30 so as to receive the service control session 11, the media flow session 12 and the media flow control session 13 in operation 112. In operation 114, the session control server 30 transmits the session transfer request, which has been received from the receiving terminal 20, to the sending terminal 10 to notify that the media service will be transferred. In response to the session transfer request being received, the sending terminal 10 transmits session information to the session control server 30 in operation 116. The session information is information for transferring or replicating a session to another terminal. The session information may include information about the media which is being currently played back by the sending terminal 10, and more particularly, identification information of content, a content playback point at the time of transmitting the session information, and session information transmission point information. The content playback point included in the session information may be time information that indicates time counted from the start of content.

Then, in operation 118, verification is performed to verify whether the media flow, the control of a session, and the control of a media flow can be transferred, and if necessary, a bookmark is created with respect to the media flow. The procedure of verification for transferring the service control session 11, the media flow control session 12 and the media flow session 13 may be performed by the receiving terminal 20, the session control server 30 or the media server 40. The procedure of creating the bookmarking with respect to the media flow may be a procedure of, for example, determining information about an image frame being played back at the time of transferring the media flow, and may be performed by the sending terminal 10 or the media server 40.

Thereafter, in operation 120, the session control server 30 and the media server 40 set a new session for the receiving terminal 20, and change the media flow and a destination address of the media flow. More specifically, the session control server 30 may modify the ongoing service control session by updating the remote leg for managing the service control session of the receiving terminal 20. The media server 40 deletes the ongoing media flow session and media flow control session between the sending terminal 10 and the media server 40, and updates the remote leg for managing the media flow session and the media flow control session with respect to the service control session 11.

In operation 122, the session control server 30 transmits a transfer response to the receiving terminal 20 to notify of establishment of a new session control setting and the media server 40 transmits the control of a media flow to the receiving terminal 20. In operation 124, the session control server 30 transmits a response to the sending terminal 10 to notify that the session has been transferred.

By the above procedures, a service control session 21 to the receiving terminal 20, a media flow control session 22 to the receiving terminal 20, and a media flow session 23 to the receiving terminal 20 are established. The session control server 30 may calculate a content playback start time point of the receiving terminal 20 which has been synchronized with the content playback point of the sending terminal 10 by using the session information received from the sending terminal 10. Content playback synchronization will be described later with reference to FIGS. 6 and 7.

Figure 2:
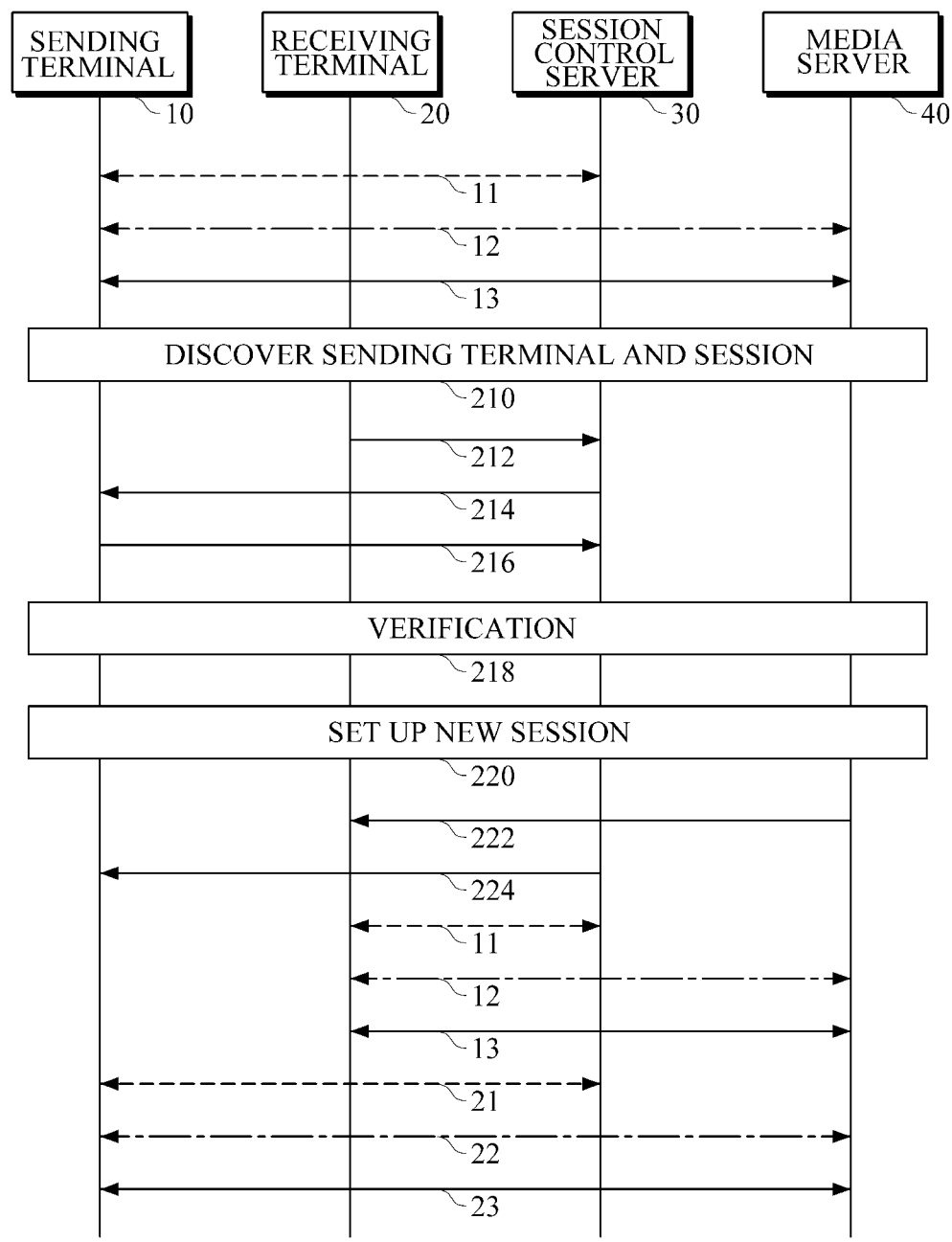
FIG. 2 is a flowchart illustrating an example of procedures of replicating a media service using a pull method.

FIG. 2 is a flowchart illustrating an example of procedures of replicating a media service using a pull method.

The example shown in FIG. 2 uses a pull method to replicate a media flow, a control of a media flow, and a control of a media session from a sending terminal 10 to a receiving terminal 20.

The sending terminal 10 is provided with a media service over a service control session 11, a media flow control session 12, and a media flow session 13. Before issuing a request for session replication, the receiving terminal 20 searches for service sessions and the sending terminal 10 which is capable of replicating the media flow in operation 210. The receiving terminal 20 transmits a session replication request to the session control server 30 so as to replicate the service control session, the media flow control session, and the media flow session of the sending terminal 10 in operation 212. In operation 214, the session control server 30 notifies the sending terminal 10 that the receiving terminal 20 has issued the session replication request.

The sending terminal 10 transmits session information to the session control server 30 in operation 216. In operation 218, verification is performed to verify whether the media flow, a control of a session, and a control of a media flow can be replicated, and if necessary, a bookmark may be created with respect to the media flow. The session control server 30 and the media server 40 add remote legs for the service control session, the media flow session, and the media flow control session with respect to the receiving terminal 20 in operation 220. In response to the replication of the media flow session, the media flow control session and the service control session being successfully performed, the session control server 30 transmits a replication response to the receiving terminal 20, and the media server 40 transmits a media stream to the receiving terminal 20 in operation 222. In operation 224, the session control server 30 may transmit a response to the sending terminal 10 to notify that the session has been transferred.

The ongoing service control session 11, media flow control session 12 and media flow session 13 of the sending terminal 10 are maintained, and a service control session 21, a media flow control session 22 and a media flow session 23 are established to the receiving terminal 20. The session control server 30 may calculate a content playback start time point of the receiving terminal 20 which is synchronized with a content playback point of the sending terminal 10 by using the session information received from the sending terminal 10. Content playback synchronization will be described later with reference to FIGS. 6 and 7.

Figure 3:
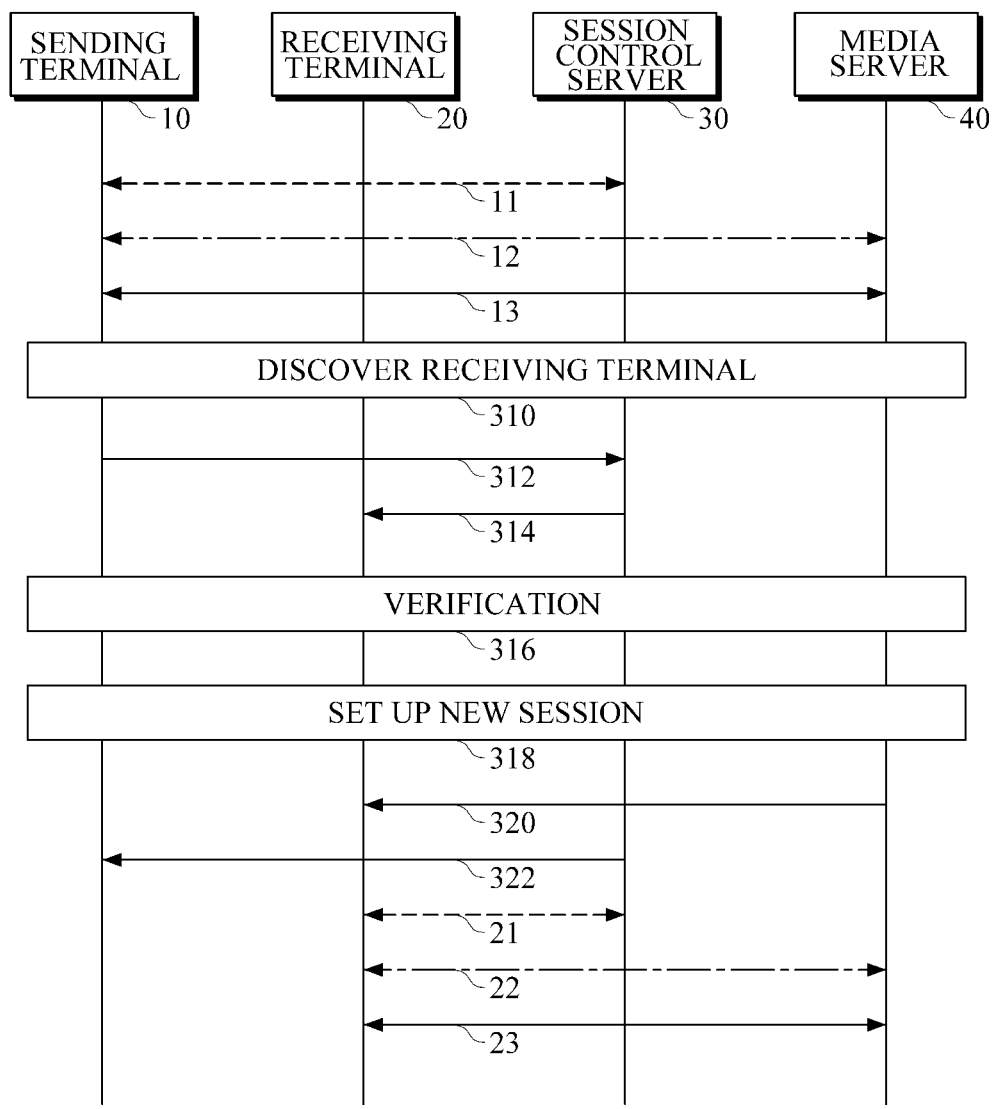
FIG. 3 is a flowchart illustrating an example of procedures of transmitting a media service using a pull method.

FIG. 3 is a flowchart illustrating an example of procedures of transmitting a media service using a pull method.

The example shown in FIG. 3 uses a pull method to transmit a media flow, a control of the media flow, and a control of a media session from a sending terminal 10 to a receiving terminal 20.

The sending terminal 10 is provided with a media service over a service control session 11, a media flow control session 12, and a media flow session 13. The sending terminal 10 is to transfer all of the service control session 11, the media flow control session 12 and the media flow session 13 to the receiving terminal 120.

Before transmitting a request for session transfer, the sending terminal 10 searches for a target device, such as the receiving terminal 20, to which the media flow can be transmitted in operation 310.

The sending terminal 10 transmits a session transfer request to a session control server 30 so as to transfer a media flow, a control of the media flow, and a control of a media session to the receiving terminal 20 in operation 312. At this time, the sending terminal 10 may also transmit session information to the session control server 30.

Authentication is performed to verify whether the service control session, the media flow control session, and the media flow session can be transferred, and if necessary, a bookmark may be created with respect to the media flow in operation 316. The session control server 30 and the media server 40 may change remote legs for the service control session, the media flow control session and the media flow session, and deletes the service control session between the sending terminal 10 and the session control server 30, the media flow control session between the sending terminal 10 and the media server 40 and the media flow session between the sending terminal 10 and the media server 40 in operation 318.

In the case the service control session, the media flow control session and the media flow session are successfully transferred, the session control server 30 transmits a transfer success response to the sending terminal 10 to notify that the service control session has been established in operation 322, and the media server 40 transmits a transfer success response to the receiving terminal 20 to notify that the media flow control session and the media flow session have been established in operation 320. The session control server 30 may transmit the transfer success response to the sending terminal 10 in operation 322. Then, a service control session, a media flow control session 22 and a media flow session 23 to the receiving terminal 20 are established.

Figure 4:
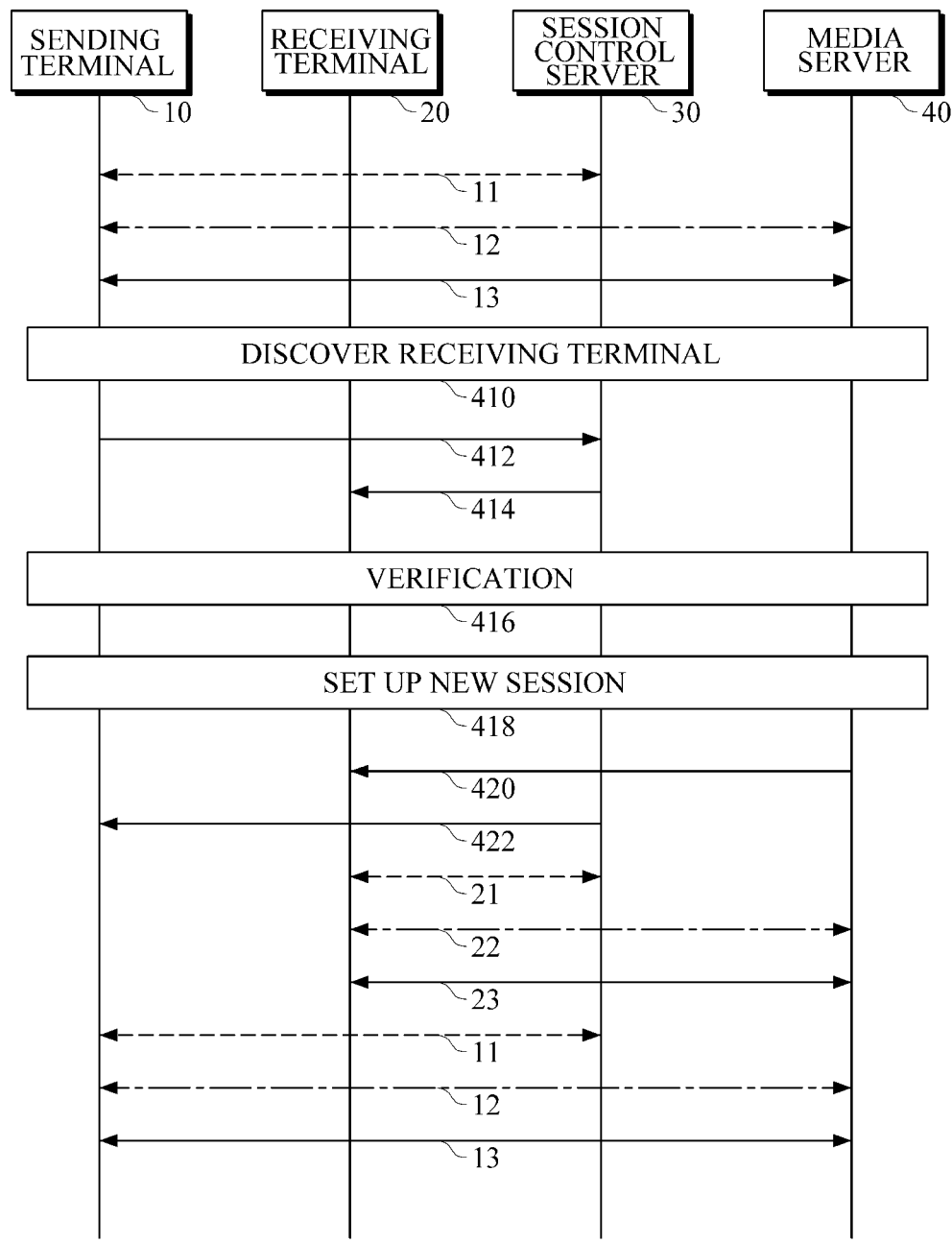
FIG. 4 is a flowchart illustrating an example of procedures of replicating a media service using a pull method.

FIG. 4 is a flowchart illustrating an example of procedures of replicating a media service using a push method.

The sending terminal 10 is provided with a media service over a service control session 11, a media flow control session 12, and a media flow session 13. The sending terminal 10 is to replicate all of the service control session, the media flow control session, and the media flow session to the receiving terminal 20. Before transmitting a request for session replication, the sending terminal 10 searches for a target device, such as the receiving terminal 20, to which the media flow can be replicated, in operation 410.

The sending terminal 10 transmits a session replication request to a session control server 30 so as to replicate the service control session, the media flow control session and the media flow session to the receiving terminal 20 in operation 412. At this time, the sending terminal 10 may transmit session information along with the session replication request or by including the session information in the session replication request to the session control server 30. The session control server 30 transmits the session replication request and the session information to the receiving terminal 20 in operation 414.

Authentication is performed to verify whether the service control session, the media flow control session, and the media flow session can be replicated, and if necessary, a bookmark is created with respect to the media flow in operation 416. The secession control server 30 and the media server 40 add remote legs for the replicated new media flow session, media flow control session and service control session in operation 418.

In the case the service control session, the media flow control session and the media flow session are successfully replicated, the session control server 30 transmits a transfer success response to the sending terminal 10 to notify that the service control session has established in operation 422, and the media server 40 transmits a transfer success response to the receiving terminal 20 to notify that the media flow control session and the media flow session have been established in operation 420. The session control server 30 may transmit a replication response to the sending terminal 10 in operation 422.

The ongoing service control session 11, media flow control session 12 and media flow session 13 of the sending terminal 10 are maintained, and a service control session 21, a media flow control session 22 and a new media flow session 23 are replicated and established to the receiving terminal 20.

Figure 5:
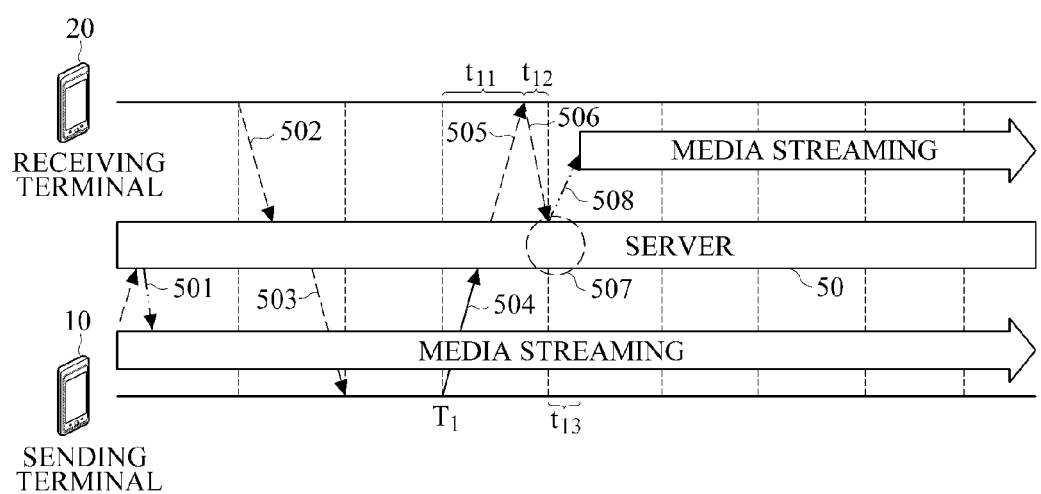
FIG. 5 is a diagram illustrating an example of a flow of session transfer/replication by use of a session control and media server in pull mode.

FIG. 5 is a diagram illustrating an example of a flow of the session control, the session transfer and the replication process using a media server in the pull mode.

A sending terminal 10 receives media stream from a session control and media server 50 as shown by arrow 501. A receiving terminal 20 transmits a session transfer/replication request message to the session control and media server 50 (hereinafter, will be referred to as a "server 50") as shown by arrow 502. The session transfer/replication request message refers to a session transfer request message, a session replication request message, or both of the session transfer request message and the session replication request message, and hereinafter, for convenience of explanation, the session transfer/replication request message will be referred to as a "session request message". The server 50 transmits the session request message to the sending terminal 10 as shown by arrow 503.

In response to the session request message, the sending terminal 10 transmits a session information message that includes session information to the server 50, as shown by arrow 504. The session information may include, as described above, an address (or content identification information) of content being currently played back, a current content playback time point, and a session information transmission time point.

The server 50 transmits the received session information to the receiving terminal 20 as shown by arrow 505. The receiving terminal 20 requests the server 50 for content based on the session information, as shown by arrow 506. The procedures 505 and 506 may be performed for verification of session transfer to the receiving terminal 20.

The server 50 calculates a first content playback start time point of content to be played back by the receiving terminal 20. During the calculation, remote leg change, session establishment may be performed. The server 50 may calculate the first content playback start time point by adding a session information transmission delay time t11 taken by the session information from the sending terminal 10 to reach the receiving terminal 20, as shown by arrows 504 and 505, and a transmission delay time including a content request message delivery time t12 taken by the receiving terminal 20 to issue a request for content, as shown by arrow 506, to the content playback time T1 at the time of transmitting the session information which includes the content playback time T1.

The session information transmission delay time t11 may include a first sub-delay time taken by the session information to be transmitted from the sending terminal to the server 50 and a second sub-delay time taken by the session information to be transmitted from the server 50 to the receiving terminal 20. The server 50 may check a session information receiving time point at which the session information is received, and may determine a difference between the session information receiving time point and a session information transmitting time point as the first sub-delay time. In addition, the content request message from the receiving terminal 20 may include the second sub-delay time and the content request message transmitting time point, and the server 50 may check the content request message receiving time point, and determine a difference between the content message receiving time point and the content request message transmitting time point as a content request message delivery time taken by the content request message to be transmitted.

The server 50 transmits the media content and the first content playback start time point to the receiving terminal 20 in operation 508.

Figure 6:
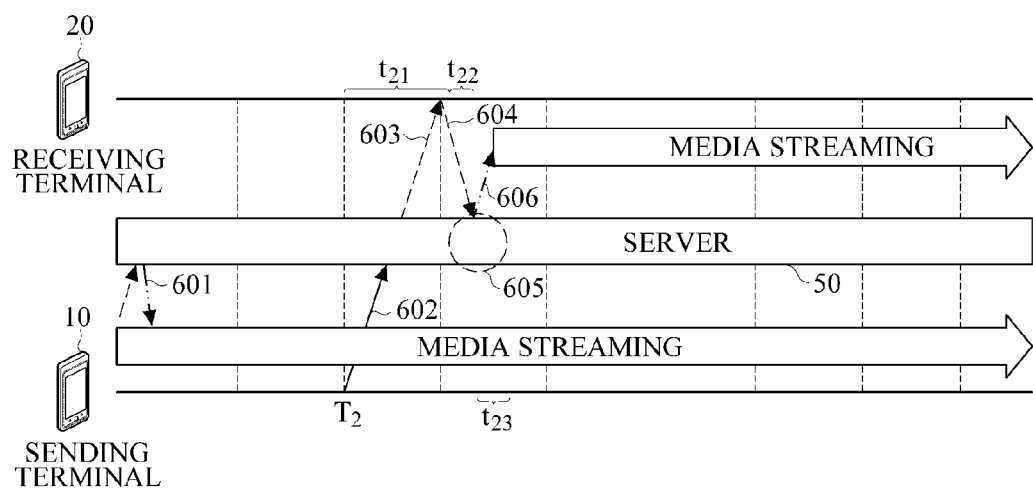
FIG. 6 is a diagram illustrating an example of a flow of session transfer/replication by use of a session control and media server in push mode.

A delivery delay time may occur when a "streaming" content is delivered from the server 50 to the receiving terminal 20 to start media streaming. In this case, the receiving terminal 20 may calculate a second content playback start time point by adding a delay time t13 that occurs when the media is delivered to the receiving terminal 20 to the first content playback start time point, and play back the streaming content. In this manner, the receiving terminal 20 and the sending terminal 10 are synchronized to have the same play back time point of the content. FIG. 6 is a diagram illustrating an example of a flow of session transfer/replication by use of a session control and media server in push mode.

A sending terminal 10 is provided with media streams from a session control and media server 50, as shown by arrow 601. The sending terminal 10 transmits a session request message to the server 50 to request the provision of currently played back content to a receiving terminal 20, as shown by arrow 602. The session request message includes session information. The session information may include an address of content being currently played back by the sending terminal 10, a current content playback time point, and a session information transmission time.

The server 50 transmits the session request message including the session information to the receiving terminal 20 as shown by arrow 603. The receiving terminal 20 requests the server 50 for media content based on the session information as shown by arrow 604.

The server 50 calculates a first content playback start time point of content to be played back by the receiving terminal 20 in operation 605. More specifically, the server 50 may calculate the first content playback start time point ts1 of the receiving terminal 20 by adding a session information delivery delay time t21 taken by the session information to be transmitted to the receiving terminal 20 and a content request message delivery time t22 taken by a content request message to be transmitted from the receiving terminal 20 to the server 50 to a content playback time point T2 that is included in the session information.

The session information deliver delay time t21 may include a first sub-delay time taken by the session information to be transmitted from the sending terminal 10 to the server 50 and a second sub-delay time taken by the session information to be transmitted from the server 50 to the receiving terminal 20. The server 50 may check a session information receiving time point at which the server 50 receives the session information, and determine a difference between the session information receiving time point and a session information transmission time point as the first sub-delay time.

In addition, the content request message from the receiving terminal 20 may include the second sub-delay time and a content request message transmission time point. The server 50 may check a content request message receiving time point, and determine a difference between the content request message receiving time point and the content request message transmission time point as a content request message deliver time that is taken by the content request message to be transmitted.

The server 50 transmits the media content and the first content playback start time point to the receiving terminal 20 as shown by arrow 606.

The receiving terminal 20 may calculate a second content playback start time point ts2 by adding a delay time t23 occurring when the media is delivered to the receiving terminal 20 to the first content playback start time point ts1, play the streaming media. In this manner, the receiving terminal 20 and the sending terminal 10 are synchronized to have the same play back time point of the content.

Figure 7:
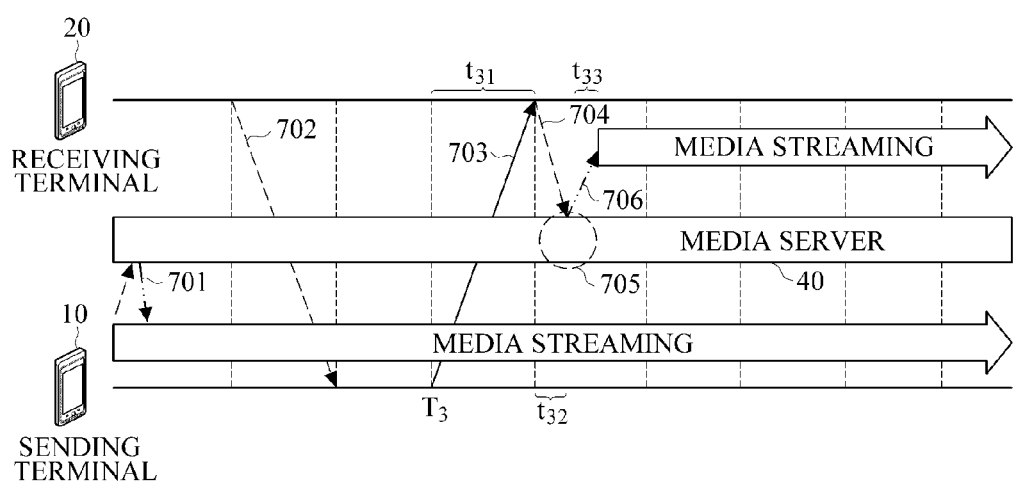
FIG. 7 is a diagram illustrating an example of a flow of session transfer/replication through direct communications between terminals in pull mode.
Figure 8:
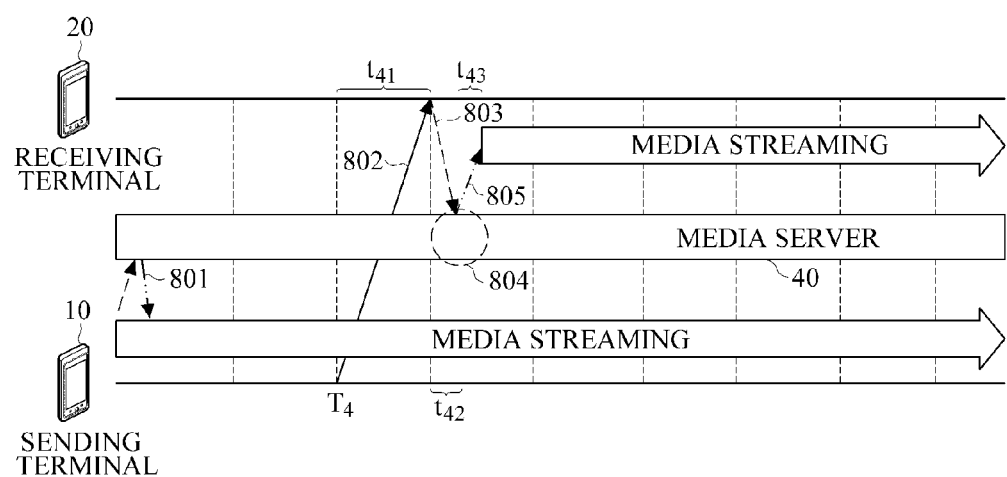
FIG. 8 is a diagram illustrating an example of a flow of session transfer/replication through direct communications between terminals in push mode.

FIGS. 7 and 8 illustrates examples for a sending terminal 10 or a receiving terminal 20 to send a session request message and to replicate and transmit session information directly to each other, with no intervention of a session-controlling server.

FIG. 7 is a diagram illustrating an example of a flow of session transfer/replication through direct communications between terminals in pull mode.

A sending terminal 10 is provided with media streams from a media server 40 as shown by arrow 701. A receiving terminal 20 transmits a session request message to the sending terminal 10 as shown by arrow 702.

In response to the session request message, the sending terminal 10 transmits a session information message including session information to the receiving terminal 20 as shown by arrow 703. The session information may include an address of content being currently played back by the sending terminal 10, a current playback time point, and a session information transmission time point.

The receiving terminal 20 transmits a content request message to the media server 40 based on the session information so as to request media content as shown by arrow 704. The media server 40 calculates a playback time point of content to be played back by the receiving terminal 20 in operation 705. More specifically, the media server 40 may calculate a first content playback time point of the receiving terminal 20 by adding a session information delivery delay time t31 taken by the session information to be transmitted from the sending terminal 10 to the receiving terminal 20 and a content request message delivery time t32 taken by a content request message to be transmitted from the receiving terminal 20 to the media server 40 to the content playback time point T3 of the sending terminal 10 that is included in the session information.

In this case, the receiving terminal 20 may check a session information receiving time point at which the session information is received, and determine a difference between the session information receiving time point and a session information transmission time point as a session information delivery delay time. In addition, the receiving terminal 20 may transmit the session information delivery delay time along with the content request message to the media server 40.

The media server 40 transmits the media content and the first content playback start time point to the receiving terminal 20 as shown by arrow 706.

A delivery delay time may occur when a media stream is delivered from the server 50 to the receiving terminal 20 to start media streaming. In this case, the receiving terminal 20 may calculate a second content playback start time point by adding a delay time t33 occurring when the media is delivered to the receiving terminal 20 to the first content playback start time point, and play the streaming media. In this manner, the receiving terminal 20 and the sending terminal 10 are synchronized to have the same play back time point of the content. FIG. 8 is a diagram illustrating an example of a flow of session transfer/replication through direct communications between terminals in push mode.

A sending terminal 10 is provided with media streams from a media server 40 as shown by arrow 801. The sending terminal 10 transmits a session request message to a receiving terminal 20 as shown by arrow 802. The sending terminal 10 may transmit session information along with the session request message or by including it into the session request message to the receiving terminal 20. The session information may include an address of content currently being played back by the sending terminal 10, a current content playback time point, and a session information transmission time point.

The receiving terminal 20 transmits a content request message to request the media server 40 for a media content based on the session information, as shown by arrow 803. The media server 40 calculates a playback time point of content to be played back by the receiving terminal in operation 804. More specifically, the media server 40 may calculate a first content playback start time point by adding a session information delivery delay time t41 taken by the session information to be transmitted from the sending terminal 10 to the receiving terminal 20 and a content request message delivery time t42 taken by the content request message from the receiving terminal 20 to the media server 40 to a content playback time point T4 of the sending terminal 10 that is included in the session information. The media server 40 transmits the media content and the first content playback start time point to the receiving terminal 20 as shown by arrow 805.

Figure 9:
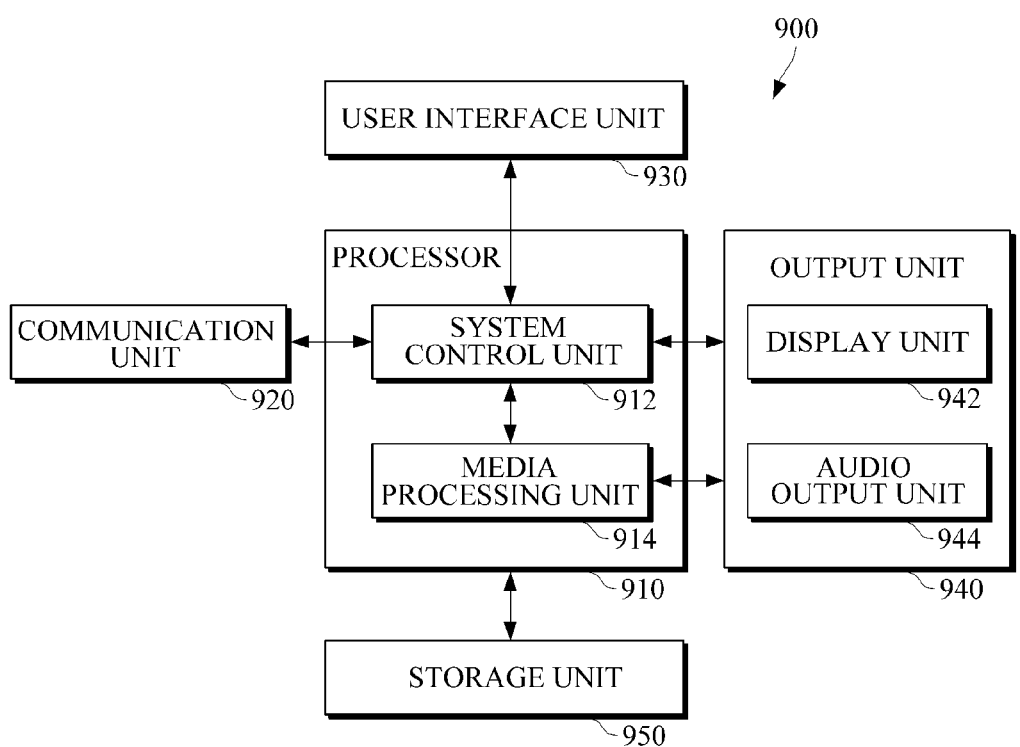
FIG. 9 is a diagram illustrating an example of a terminal apparatus.

The receiving terminal 20 calculates a second content playback start time point ts2 by adding a delay time t43 occurring when the media is delivered to the receiving terminal 20 to the first content playback time point, and reproduce the streaming media. In this manner, the receiving terminal 20 and the sending terminal 10 are synchronized to have the same play back time point of the content. FIG. 9 is a diagram illustrating an example of a terminal apparatus.

A terminal apparatus 900 may be the sending terminal 10 or the receiving terminal 20 as described above. The terminal apparatus 900 may be a stationary device, such as a large display device, or a mobile device, such as a mobile phone, a smartphone, a personal digital assistant (PDA), a laptop computer, and the like, and the type of the terminal apparatus may vary. The terminal apparatus 900 may include a processor 910, a communication unit 920, a user interface unit 930, an output unit 940, and a storage unit 950.

The processor 910 may include a system control unit 912 and a media processing unit 914.

The system control unit 912 may be configured to be connected to the media processing unit 914, the communication unit 920, the user interface unit 930, the output unit 940, and the storage unit 950 to control the overall operation of the terminal apparatus 900. The system control unit 912 may manage a service control session, a media flow session and a media flow control session, which are established by the communication unit 920, and manage session information.

In response to a media content stream being received from a media server 40 through the communication unit 920, the media processing unit 914 may decode the media content stream in such a manner that can be output through the output unit 940. The media processing unit 914 may manage a content playback time point. Thus, when the system control unit 912 creates a session information message including session information, the media processing unit 914 may provide the system control unit 912 with information about a content playback time point at the time of the creation.

The user interface unit 930 may be implemented as a keypad, a touch pad, a mouse and any other user input devices. The user interface unit 930 receives a user input and delivers it to the system control unit 912, thereby allowing operation to be performed in response to the user input.

The output unit 940 may include a display unit 942 and an audio output unit 944. The display unit 942 may be a display device to display video content. The audio output unit 944 may be a speaker to output audio content.

First, operation of the terminal apparatus 900 as the sending terminal 10 will now be described.

In a case in which the sending terminal 10 and the receiving terminal 20 transmit and receive a message through a server 50 serving a session control function in pull mode, the system control unit 912 may receive a session request message from the server 50 to request the sending terminal 10 to provide currently played back content to the receiving terminal 20. In response to the session request message being accepted, the system control unit 912 may transmit the session information to the server 50 through the communication unit 920.

In a case in which the sending terminal 10 and the receiving terminal 20 transmit and receive a message through the server 50 serving a session control function in push mode, the system control unit 912 may control the communication unit 920 to transmit session information along with a session request message to the server 50.

In a case in which the sending terminal 10 and the receiving terminal 20 directly transmit and receive a message in pull mode, the system control unit 912 may receive a session request message from the receiving terminal 20 that requests the sending terminal 10 to provide currently played back content to the receiving terminal 20. In response to the session request message being received, the system control unit 912 may transmit session information to the receiving terminal 20 through the communication unit 920.

In a case in which the sending terminal 10 and the receiving terminal 20 directly transmit and receive a message in push mode, the system control unit 912 may control the communication unit 920 to transmit session information along with a session request message to the receiving terminal 20.

Hereinafter, operation of the terminal apparatus 900 as the receiving terminal 20 will now be described.

In a case in which the sending terminal 10 and the receiving terminal 20 transmits a message through the server 50 serving a session control and media function, the media processing unit 914 may calculate a second content playback start time point by adding a content deliver time taken by content to be transmitted from the server 50 to a first content playback start time point, and play back the content at the second content start time point.

In a case in which the sending terminal 10 and the receiving terminal 20 directly transmit and receive a message, the media processing unit 914 calculates a second content playback start time point by adding a content delivery time taken by content to be transmitted from the media server 40 to the first content playback start time point, and reproduce the content based on the second content playback start time point.

Figure 10:
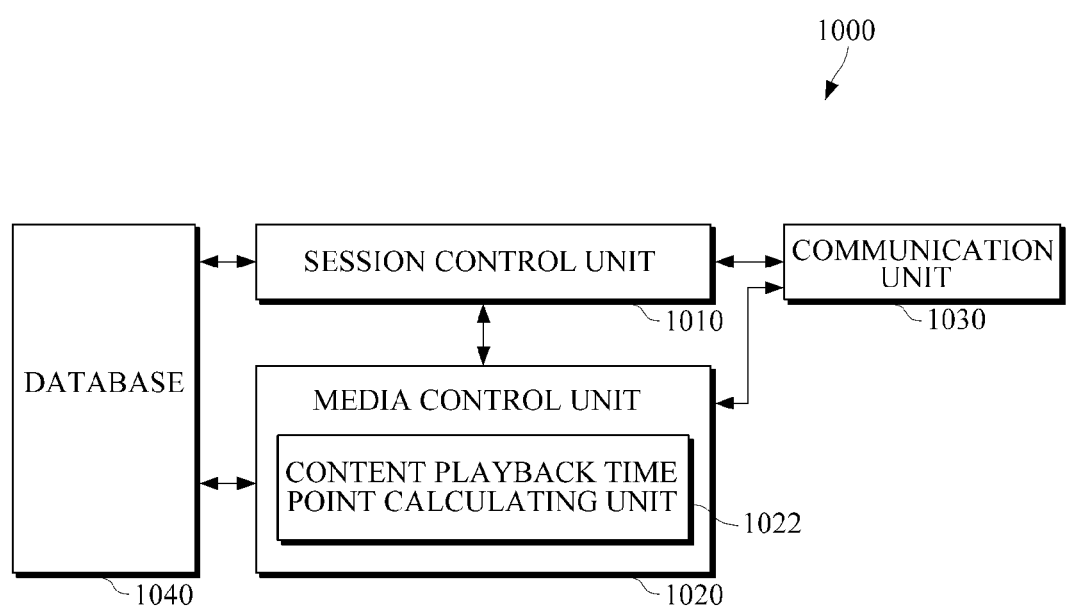
FIG. 10 is a diagram illustrating an example of a server.

FIG. 10 is a diagram illustrating an example of a server.

A server 1000 may include a session control unit 1010, a media control unit 1020, a communication unit 1030 and a database 1040.

The communication unit 1030 communicates a sending terminal and a receiving terminal, and transmits a message and media, which are provided from the session control unit 1010 and the media control unit 1020 for session control, to the sending terminal and/or the receiving terminal. The communication unit 1030 may transmit message transmission time point information along with the message.

The session control unit 1010 manages service control sessions to terminal apparatuses that communicate with the server 1000.

The media control unit 1020 manages media control sessions and media flow control sessions to the terminal apparatuses that communicate with the server 1000. The media control unit 1020 may include a content playback time point calculating unit 1022 to calculate a content playback start time point in an effort to provide content of the sending terminal that is in synchronization with the receiving terminal.

The content playback time point calculating unit 1022 may calculate a first content playback start time point of the receiving terminal by adding a transmission delay time to a content playback time point of the receiving terminal that is included in session information, wherein the transmission delay time includes a session information delivery delay time taken by the session information to be transmitted from the sending terminal to the receiving terminal and a content request message delivery time taken by a content request message to be transmitted from the receiving terminal to the server.

According to the present invention, the play back time points of a media content can be synchronized playback time among the devices, thereby providing the users with the media content at the same play back time point in a network-based media content service environment.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A content synchronization method for providing a receiving terminal with content of a sending terminal in a system that includes the sending terminal, the receiving terminal and a server to provide content to the sending terminal and the receiving terminal, comprising:

receiving, at the server, a session request message from the receiving terminal to request the sending terminal to provide content, that is currently being played back at the sending terminal, to the receiving terminal;

receiving, at the server, session information including identification information of the content, a content playback point at the time of transmitting the session information, and session information transmission point information from the sending terminal;

calculating a first content playback start time point by adding a transmission delay time to a content playback time point of the sending terminal at the time of transmitting the session information that is included in the session information, the transmission delay time including a session information delivery delay time taken by the session information to be transmitted from the sending terminal to the receiving terminal and a content request message delivery time taken by the content request message to be transmitted from the receiving terminal to the server to request the content calculating, at the receiving terminal, a second content playback start time point by adding a content delivery time taken by the content to be transmitted from the server to the first content playback start time point; and playing back, at the receiving terminal, the content at the second content playback start time point.

2. The content synchronization method of claim 1, wherein the session information includes content identification information of the content being currently played back by the sending terminal and a session information transmission time point at which the sending terminal transmits the session information.

3. The content synchronization method of claim 2, wherein the session information delivery delay time includes a first sub-delay time taken by the session information to be transmitted from the sending terminal to the server and a second sub-delay time taken by the session information to be transmitted from the server to the receiving terminal.

4. The content synchronization method of claim 3, wherein the server checks a session information receiving time point, at which the server receives the session information, and determines a difference between the session information receiving time point and the session information transmission time point as the first sub-delay time.

5. The content synchronization method of claim 3, wherein the content request message includes the second sub-delay time and a content request message transmission time point, at which the content request message is sent, and the server checks a content request message receiving time point and determines a difference between the content message receiving time point and the content request message transmission time point as the content request message delivery time taken by the content request message to be transmitted.

6. A content synchronization method for providing a receiving terminal with content of a sending terminal in a system that includes the sending terminal, the receiving terminal and a server to provide the content to the sending terminal and the receiving terminal, comprising:
- receiving, at the server, a session request message including session information of the sending terminal from the sending terminal to request the server to provide content currently being played back by the sending terminal;
- calculating a first content playback start time point by adding a transmission delay time to a content playback start time point of the sending terminal at the time of transmitting the session information that is included in the session information, the transmission delay time including a session information delivery delay time taken by the session information to be transmitted to the receiving terminal and a content request message delivery time taken by a content request message to be transmitted from the receiving terminal to the server to request the content;
- calculating, at the receiving terminal, a second content playback start time point by adding a content delivery time taken by the content to be transmitted from the server to the first content playback start time point; and
- playing back, at the receiving terminal, the content at the second content playback start time point,
- wherein the session information includes identification information of the content, a content playback point at the time of transmitting the session information and session information transmission point information.

7. The content synchronization method of claim 6, wherein the session information includes content identification information of the content being currently played back by the sending terminal and a session information transmission time point at which the sending terminal transmits the session information.

8. The content synchronization method of claim 7, wherein the session information delivery delay time includes a first sub-delay time taken by the session information to be transmitted from the sending terminal to the server and a second sub-delay time taken by the session information to be transmitted from the server to the receiving terminal.

9. The content synchronization method of claim 8, wherein the server checks a session information receiving time point, at which the server receives the session information, and determines a difference between the session information receiving time point and the session information transmission time point as the first sub-delay time.

10. The content synchronization method of claim 8, wherein the content request message includes the second sub-delay time and a content request message transmission time point, at which the content request message is sent, and the server checks a content request message receiving time point and determines a difference between the content message receiving time point and the content request message transmission time point as the content request message delivery time taken by the content request message to be transmitted.

11. A content synchronization method for providing a receiving terminal with content of a sending terminal in a system that includes the sending terminal, the receiving terminal and a server to provide the content to the sending terminal and the receiving terminal, comprising:
- receiving, at the sending terminal, a session request message from the receiving terminal to request the sending terminal to provide content, that is currently being played back at the sending terminal, to the receiving terminal;
- transmitting, at the sending terminal, session information including identification information of the content, a content playback point at the time of transmitting the session information and session information transmission point information to the receiving terminal;
- calculating, at the server, a first content playback start time point by adding a transmission delay time to a content playback time point of the sending terminal at the time of transmitting the session information that is included in the session information, the transmission delay time including a session information delivery delay time taken by the session information to be transmitted from the sending terminal to the receiving terminal and a content request message delivery time taken by a content request message to be transmitted from the receiving terminal to the server to request the content;
- calculating, at the receiving terminal, a second content playback start time point by adding a content transmission time taken by the content to be transmitted from the server to the receiving terminal to the first content playback start time point; and
- playing back, at the receiving terminal, the content based on the second content playback start time point.

12. The content synchronization method of claim 11, wherein the session information further comprises content identification information of the content being currently played back by the sending terminal and a session information transmission time point at which the sending terminal transmits the session information.

13. The content synchronization method of claim 12, further comprising:
- checking, at the receiving terminal, a session information receiving time point at which the session information is received, and determining a difference between the session information receiving time point and the session information transmission time point as the session information delivery delay time; and
- transmitting the session information delivery delay time along with the content request message to the server.

14. A content synchronization method for providing a receiving terminal with content of a sending terminal in a system that includes the sending terminal, the receiving terminal and a server to provide the content to the sending terminal and the receiving terminal, the content synchronization method comprising:
- receiving, at the receiving terminal, a session request message including session information from the sending terminal to request the sending terminal to provide content, that is currently being played back at the sending terminal, to the receiving terminal;
- transmitting, at the receiving terminal, a content request message to the server to request the content;
- calculating, at the server, a first content playback start time point of the receiving terminal by adding a transmission delay time to a content playback time point of the sending terminal at the time of transmitting the session information, the transmission delay time including a session information delivery delay time taken by the session information to be transmitted from the sending terminal to the receiving terminal and a content request message delivery time taken by a content request message to be transmitted from the receiving terminal to the server to request the content;

calculating, at the receiving terminal, a second content playback start time point by adding a content transmission time taken by the content to be transmitted from the server to the receiving terminal to the first content playback start time point; and playing back, at the receiving terminal, the content based on the second content playback start time point, wherein the session information includes identification information of the content, a content playback point at the time of transmitting the session information and session information transmission point information.

15. A content synchronization system comprising:

a sending terminal;

a receiving terminal; and a server configured to provide the receiving terminal with the content of the sending terminal, wherein the server further comprises:

a communication unit configured to communicate with the sending terminal and the receiving terminal and to transmit a message containing a sending time point of the message, and a content playback time point calculating unit configured to calculate a first content playback start time point of the receiving terminal in an effort to provide the content of the sending terminal that is synchronized with the receiving terminal, and wherein the content playback time point calculating unit calculates a first content playback start time point of the receiving terminal by adding a transmission delay time to a content playback time point of the sending terminal at the time of transmitting session information, the transmission delay time including a session information delivery delay time taken by the session information to be transmitted from the sending terminal to the receiving terminal and a content request message delivery time taken by a content request message to be transmitted from the receiving terminal to the server to request the content, wherein the receiving terminal is configured to calculate a second content playback start time point by adding a content transmission time taken by the content to be transmitted from the server to the receiving terminal to the first content playback start time point and to reproduce the content based on the second content playback start time point, wherein the session information includes identification information of the content, a content playback point at the time of transmitting the session information and session information transmission point information.

16. The content synchronization system of claim 15, wherein the session information further comprises content identification information of the content being currently played back by the sending terminal and a session information transmission time point at which the sending terminal transmits the session information.

\* \* \* \* \*